United States Patent
John et al.

(10) Patent No.: US 12,258,128 B2
(45) Date of Patent: Mar. 25, 2025

(54) AIRCRAFT OVERHEAD BIN NET SYSTEM

(71) Applicant: B/E Aerospace, Inc., Winston Salem, NC (US)

(72) Inventors: Risil John, Pathanamthitta (IN); Madhan Babu Arjunan, Tamil Nadu (IN); Sharad Anand Shivaprasad, Bangalore (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 160 days.

(21) Appl. No.: 18/110,773

(22) Filed: Feb. 16, 2023

(65) Prior Publication Data
US 2024/0199211 A1 Jun. 20, 2024

(30) Foreign Application Priority Data
Dec. 14, 2022 (IN) .............. 202241072307

(51) Int. Cl.
*B64D 11/00* (2006.01)
*B65D 45/22* (2006.01)

(52) U.S. Cl.
CPC ............ *B64D 11/003* (2013.01); *B65D 45/22* (2013.01)

(58) Field of Classification Search
CPC ....... B64D 11/003; A47B 96/00; B65D 45/22; B65D 45/20; B65D 45/16; B65D 43/16
USPC ....... 220/326, 324, 315, 830, 827, 810, 836, 220/254.2, 254.1; 312/291; 244/118.2, 244/118.1
See application file for complete search history.

(56) References Cited

U.S. PATENT DOCUMENTS

| | | | |
|---|---|---|---|
| 5,035,471 A | 7/1991 | Ackerman | |
| 5,823,472 A | 10/1998 | Luria | |
| 5,868,353 A | 2/1999 | Benard | |
| 5,988,565 A | 11/1999 | Thomas et al. | |
| 6,527,325 B2 | 3/2003 | Steingrebe et al. | |
| 8,727,278 B2 * | 5/2014 | Moritz | F16F 1/18 244/118.5 |
| 2012/0012702 A1 | 1/2012 | Moritz | |
| 2023/0003066 A1 * | 1/2023 | Rheaume | E05D 15/463 |
| 2023/0025168 A1 * | 1/2023 | Weng | B64D 11/003 |
| 2023/0039908 A1 * | 2/2023 | Patel | B64D 11/003 |

FOREIGN PATENT DOCUMENTS

| | | | |
|---|---|---|---|
| DE | 2545385 | 4/1977 | |
| EP | 1114773 | 7/2001 | |
| FR | 2320864 | 3/1977 | |
| WO | WO-9943545 A1 * | 9/1999 | ........... B64D 11/003 |

OTHER PUBLICATIONS

European Patent Office, European Search Report dated Apr. 26, 2024 in Application No. 23212443.8.

* cited by examiner

*Primary Examiner* — Robert J Hicks
(74) *Attorney, Agent, or Firm* — SNELL & WILMER L.L.P.

(57) ABSTRACT

An overhead stowage bin includes a ceiling panel, a back panel, a lower panel, and a plurality of side panels, a cabin door, a net, and a locking mechanism. The ceiling panel, the back panel, the lower panel, and the plurality of side panels defining a volume configured to stow luggage. The cabin door is configured to enclose the volume and configured to rotate about a hinge disposed on the ceiling panel. The net is configured to extend along the cabin door in an extended position. The locking mechanism is configured to lock the net to the cabin door.

17 Claims, 11 Drawing Sheets

AIRCRAFT OVERHEAD BIN NET SYSTEM

CROSS-REFERENCE TO RELATED APPLICATIONS

This application claims priority to, and the benefit of, India Patent Application No. 202241072307 (DAS CODE: 4D8C), filed Dec. 14, 2022, and titled "AIRCRAFT OVERHEAD BIN NET SYSTEM," which is incorporated by reference herein in its entirety for all purposes.

FIELD

The present disclosure relates to stowage compartments, and, more specifically, to overhead stowage bins for aircraft.

BACKGROUND

Aircrafts generally include overhead stowage bins for passengers to stow their carry-on luggage during flight. Carry-on items stowed in the overhead stowage bin may shift during flight. Improper stowage of luggage may cause a variety of in-flight injuries to the passengers on board, particularly head injuries, neck fracture and more severe injuries if the bags fall with enough force. Most commercial aircraft have a forty-pound (eighteen kg) weight limit which is potentially sufficient to cause serious issues to passengers and attendants. While stowing the luggage may be secured using proper procedures, due to normal flight maneuvers, especially during turbulence, items may shift, which in turn may cause the items to fall out when the bins are opened. Another potential cause of injury is overloading beyond the capacity, which induces over stress on the bin latches and may cause the bins to open spontaneously. Securing the luggage in the overhead stowage bins to prevent objects from falling out the bin is relevant to passenger and flight attendant safety.

SUMMARY

Disclosed herein is a system for an overhead stowage bin. The overhead stowage bin includes a ceiling panel, a back panel, a lower panel, and a plurality of side panels, a cabin door, a net, and a locking mechanism. The ceiling panel, the back panel, the lower panel, and the plurality of side panels define a volume configured to stow luggage. The cabin door is configured to enclose the volume and configured to rotate about a hinge disposed on the ceiling panel. The net is configured to extend along the cabin door in an extended position. The locking mechanism is configured to lock the net to the cabin door.

In various embodiments, the locking mechanism comprises a first projection disposed on the cabin door such that the first projection extends from the cabin door toward the net.

In various embodiments, the first projection includes a first portion and a second portion extending perpendicularly from the first portion.

In various embodiments, the locking mechanism includes a second projection disposed on the net such that the second projection extends from the net toward the cabin door.

In various embodiments, the second projection includes a first portion and a second portion extending perpendicularly from the first portion.

In various embodiments, the first projection is configured to engage with the second projection such that the second portion of the first projection is in confronting relation with the second portion of the second projection.

In various embodiments, the overhead stowage bin further includes a rotating rod configured to couple to the net and configured to couple to the plurality of side panels such that the net extends along the rotating rod between the plurality of side panels.

In various embodiments, the overhead stowage bin further includes a spring mechanism coupled to the rotating rod.

In various embodiments, the locking mechanism maintains a tension of the net such that the net compelled to retract via the spring mechanism prevented by the engagement between the first projection and the second projection.

In various embodiments, the overhead stowage bin further includes a biasing member disposed along the cabin door and operably coupled to the first projection such that the biasing member is configured to bias the first projection toward the second projection.

Disclosed herein is a system for an overhead stowage bin. The overhead stowage bin includes a ceiling panel, a back panel, a lower panel, and a plurality of side panels, a cabin door, a net, and a locking mechanism. The ceiling panel, the back panel, the lower panel, and the plurality of side panels define a volume configured to stow luggage. The cabin door configured to enclose the volume and configured to rotate about a hinge disposed on the ceiling panel. The net configured to extend along the cabin door in an extended position. The locking mechanism configured to lock the net in the extended position.

In various embodiments, the overhead stowage bin further includes a rotating rod configured to couple to the net and configured to couple to the plurality of side panels such that the net extends along the rotating rod between the plurality of side panels.

In various embodiments, the overhead stowage bin further includes a spring mechanism coupled to the rotating rod.

In various embodiments, the overhead stowage bin further includes a clip disposed along an edge of the net.

In various embodiments, the locking mechanism includes a base having a first end and a second end opposite the first end. The base is coupled to the lower panel.

In various embodiments, the overhead stowage bin further includes a biasing assembly coupled to the base. The biasing assembly includes a biasing member fixed to the base at the first end and a surface.

In various embodiments, the biasing member and the surface are configured to operate in conjunction such that when a force is applied to the surface, the biasing member is compressed.

In various embodiments, the overhead stowage bin further includes a lock pin assembly configured to rotate about a fixed point at the first end of the base. The lock pin assembly includes a first portion extending parallel to the base and coupled to the base at the first end, and a second portion configured to extend perpendicularly from the first portion, such that the second portion is configured to be in confronting relation with the surface.

In various embodiments, the overhead stowage bin further includes a push button disposed along the cabin door and configured to trigger the lock pin assembly and the biasing assembly, such that in response to the cabin door closing, the push button causes the clip to interface with the second portion of the lock pin assembly, causing rotation of the first portion, and allowing the clip to continue moving toward the first end of the base until the clip clears the second portion and the second portion rebounds to its original position, capturing the clip against the surface with the biasing member applying a force against the clip to secure it in place.

In various embodiments, the locking mechanism maintains a tension of the net such that the net compelled to retract via the spring mechanism is prevented by the engagement of the clip between the surface and the second portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Disclosed herein is an aircraft overhead bin net system. The aircraft overhead bin net system is integrated into a luggage bin door where a net can be attached and detached from the door. The aircraft overhead bin net system can be opened and closed along with the cabin door without additional interventions from the crew members but while cabin door is locked, the net will provide additional restrain to the luggage inside the bin. In various embodiments, a spring mechanism is provided between hinges of the cabin door which connects to an upper/ceiling panel of the overhead cabin. In various embodiments, this spring mechanism extends and retracts the net if the net is not attached to door or not locked in the cabin. For instance, before the flight operation, the net may be extended and locked on to the door. Thus, the net may be attached to the door during opening and closing. When the cabin door is closed, the net is optionally detached from the door and locked on the bin. Thus, the crew has the option to open the door alone if desired for inspection. After the operation, in various embodiments, while opening the door, the cabin door lock can be released, which pushes the net back to the door, locking the net to the door.

The cabin door may be opened separately to allow a flight crew member to inspect if the net is in a deployed, or extended position. Further, the net may be checked and/or fastened manually without which can help reduce the loading time for crew members. Thus, in various embodiments, the aircraft overhead bin system provides improved functionality in restraining luggage bags in the stowage compartment by adding a net to fully cover the luggage, ensuring safety of the passengers by restricting the motion of luggage during heavy turbulence. Moreover, the aircraft overhead bin system gives an additional constraint to the door which, even if the cabin door lock is opened, the net would stay in place, securing the luggage and reducing the stress and load time for the flight crew.

Figure 1:
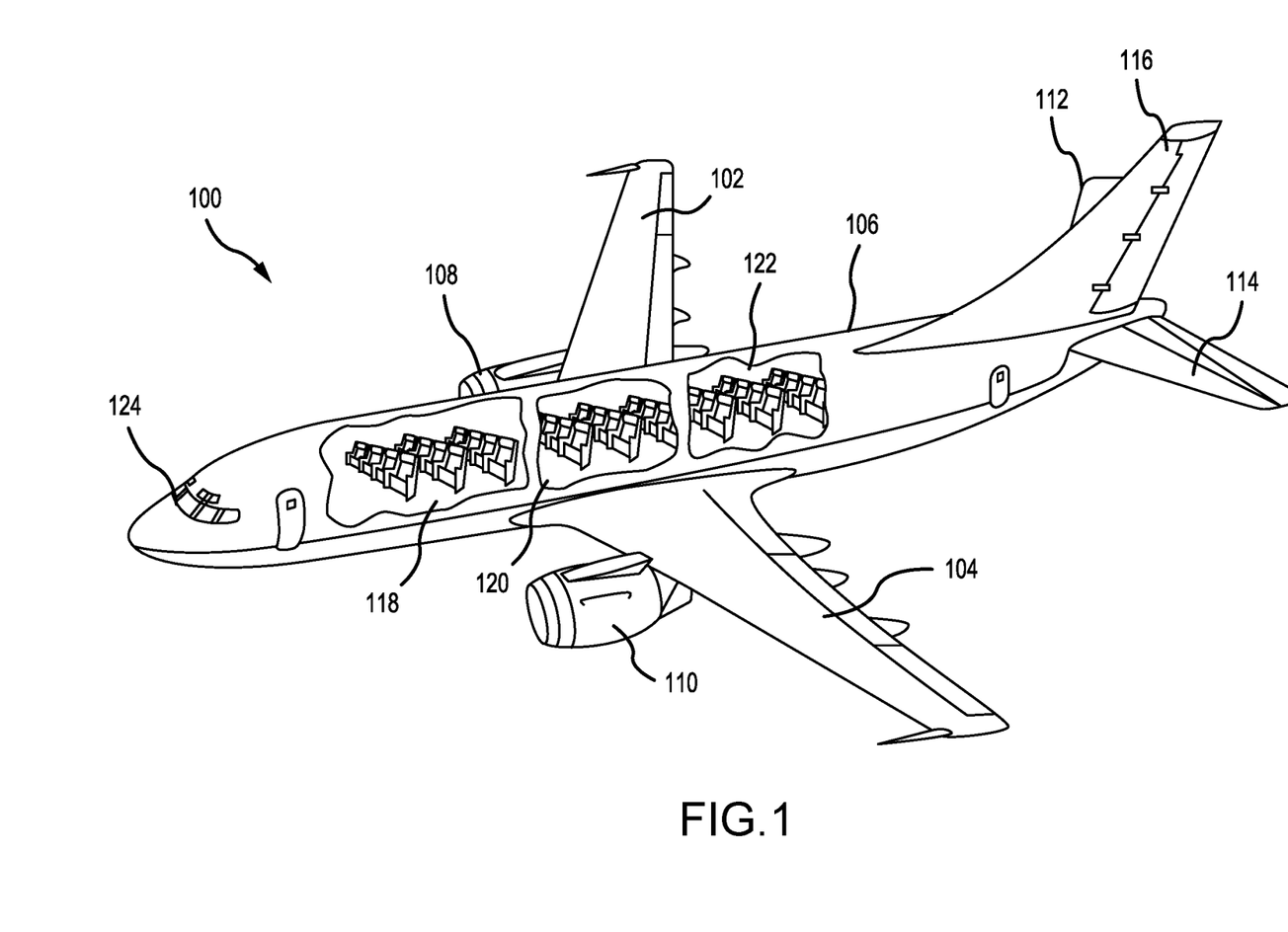
FIG. 1 illustrates an aircraft and various sections within the aircraft, in accordance with various embodiments.

Referring now to FIG. 1, in accordance with various embodiments, an aircraft 100 and various sections within the aircraft is illustrated. In various embodiments, the aircraft 100 has a starboard wing 102 and a port wing 104 attached to a fuselage 106. In various embodiments, the aircraft 100 also includes a starboard engine 108 connected to the starboard wing 102 and a port engine 110 connected to the port wing 104. In various embodiments, the aircraft 100 also includes a starboard horizontal stabilizer 112, a port horizontal stabilizer 114, and a vertical stabilizer 116. In various embodiments, the aircraft 100 also includes various cabin sections, including, for example, a first cabin section 118, a second cabin section 120, a third cabin section 122, and a pilot cabin 124.

Figure 2:
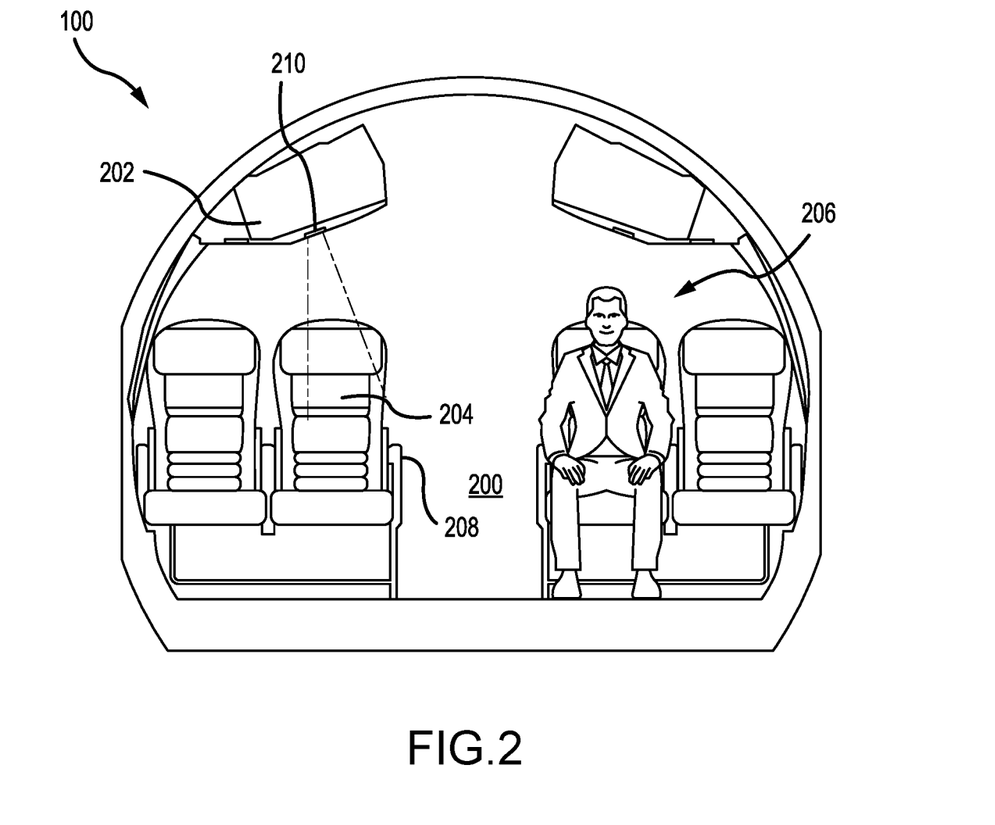
FIG. 2 illustrates a cabin of an aircraft, in accordance with various embodiments.

Referring now to FIG. 2, in accordance with various embodiments, a cabin of an aircraft 100 is illustrated. Cabin 200 may be a cabin such as the first cabin section 118, the second cabin section 120, or the third cabin section 122 of FIG. 1. In various embodiments, the cabin 200 may include overhead storage bins 202, passenger seats 204 for supporting passengers 206, armrest 208, lavatory surfaces, Portable Electronic Devices, and other structures/surfaces. In various embodiment, the cabin 200 may include passenger service units (PSUs) 210 that control various functions for passengers in the cabin 200, such as reading lighting, air conditioning, and a flight attendant call signal.

Figure 3A:
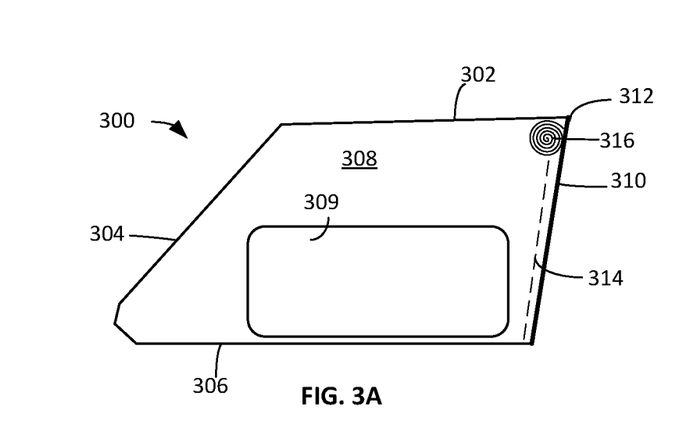
FIGS. 3A, 3B and 3C illustrate side views of an overhead stowage bin, in accordance with various embodiments.
Figure 3B:
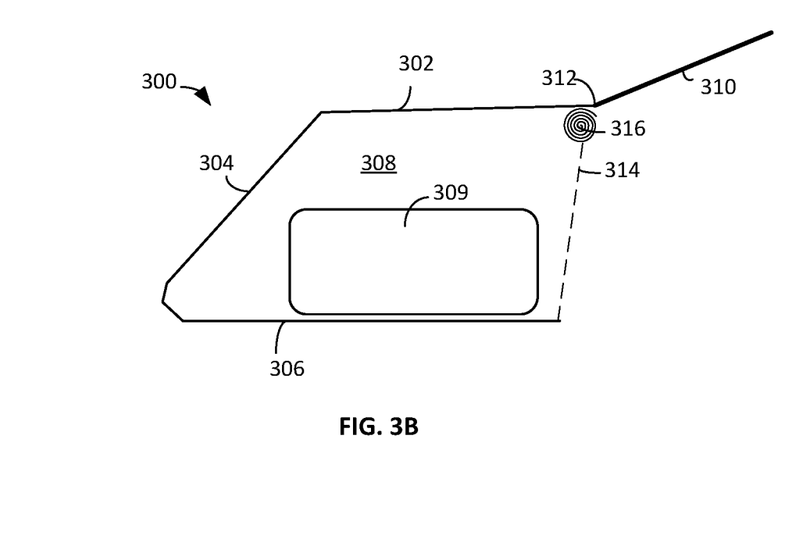
Figure 3C:
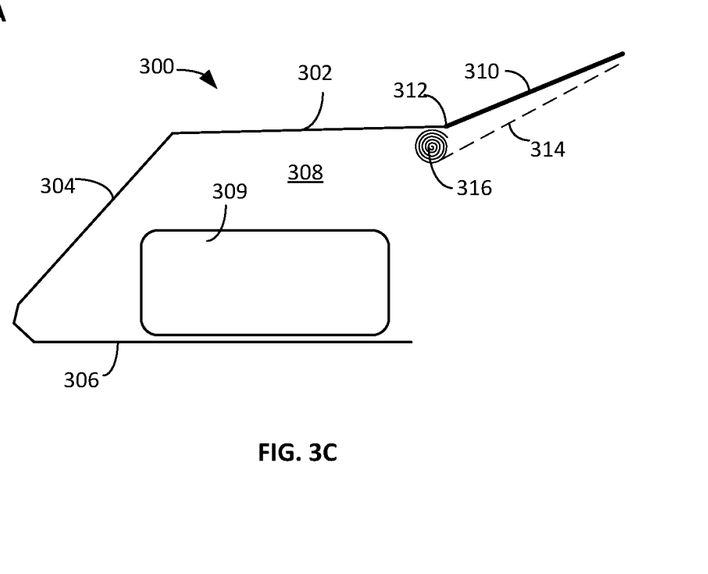
Figure 3D:
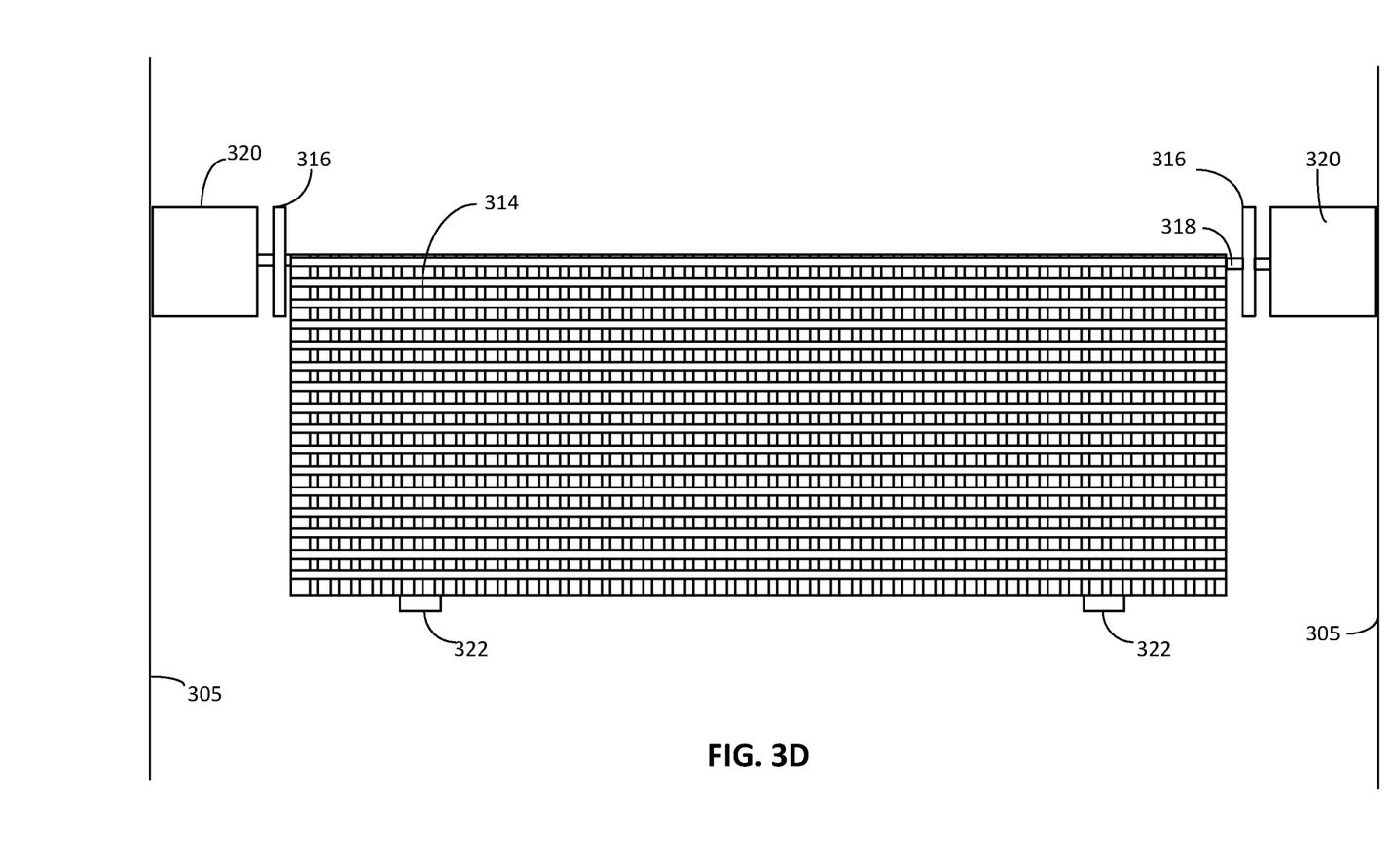
FIG. 3D illustrates a front view of an overhead stowage bin, in accordance with various embodiments.

Referring now to FIGS. 3A-3D, an overhead stowage bin 300 (e.g., bin 300) is illustrated in a closed position (e.g., FIG. 3A) and an open position (e.g., FIGS. 3B-3C). Overhead stowage bin 300 may include a ceiling panel 302, a back panel 304, and a lower panel 306. The ceiling panel 302 may be substantially parallel to the lower panel 306, and the back panel 304 may extend therebetween. The bin 300 includes a plurality of side panels 305. The plurality of side panels 305 are configured to couple with the ceiling panel 302, the back panel 304, and the lower panel 306. Accordingly, the ceiling panel 302, the back panel 304, and a lower panel 306 may define a volume 308 configured to receive and store carry-on luggage 309. The bin 300 further includes a cabin door 310. The cabin door 310 may be configured to extend between the ceiling panel 302 and the lower panel 306. For instance, the bin 300 may include a hinge 312 disposed on the ceiling panel 302 such that the cabin door 310 is configured to be coupled to the ceiling panel 302 via the hinge 312. The cabin door 310 is configured to rotate about the hinge 312 from the closed position to the open position.

The bin 300 includes a net 314. The net 314 is configured to extend between the plurality of side panels 305. For instance, the net 314 may be coupled to a rotating rod 318 that is configured to extend between and be coupled to the plurality of side panels 305 via brackets 320. In an extended position, the net 314 is configured to extend from the ceiling panel 302 to the lower panel 304. For instance, the net 314 may extend parallel to the cabin door 310. The bin 300 includes a spring mechanism 316. The spring mechanism 316 is configured to retract and extend the net 314 (e.g., the net 314 may be configured to roll up). As will be described in detail herein, the net 314, when extended, may be configured to lock to the lower panel 304 (e.g., a locking mechanism) such that the cabin door 310 may be opened while the net 314 secures the luggage 309 in place (e.g., FIG. 3B), and the net 314 may be configured to lock to the cabin door 310 such that the net 314 rotates via the hinge 312 with the cabin door 310, thus allowing access to the luggage 309.

The net 314 may include at least one clip 322. The clip 322 may be disposed on an edge of the net 314. For instance, the clip 322 may be coupled to the net 314 at a bottom edge (e.g., the exposed edge of the net 314 when the net 314 is retracted). The clip 322 may be configured to lock the net 314 in the bin 300, as is disclosed further herein.

Figure 4:
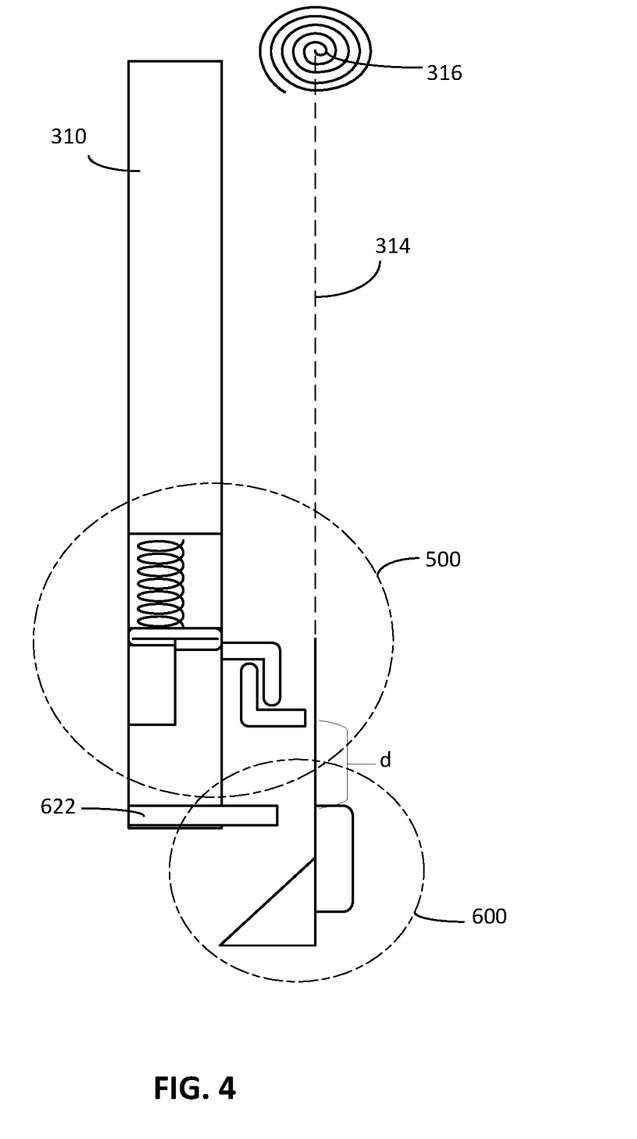
FIG. 4 illustrates a detailed view of an overhead stowage bin, in accordance with various embodiments.

Referring now to FIG. 4, a detailed view of the overhead stowage bin 300 is illustrated. Particularly, the cabin door 310 and the net 314 are shown in the closed position. The bin 300 includes a first locking mechanism 500 and a second locking mechanism 600. The first locking mechanism 500, as is described further with reference to FIGS. 5A-5F, is configured to lock the net 314 to the door 310. The second locking mechanism 600, as is described further with reference to FIGS. 6A-6J, is configured to lock the net 314 to the lower panel 306. A distance d between the first locking mechanism (e.g., particularly, the second projection) to the first locking mechanism 600 (e.g., the clip) is negligible such that the force is transferred from the cabin door to the net clip effectively. If the distance is too high, the force with not transfer appropriately.

Referring now to FIGS. 5A-5F, the first locking mechanism 500 is illustrated throughout the process of locking and unlocking (e.g., attaching and detaching) the door 310 and the net 314. The first locking mechanism 500 may include a first projection 502 and a second projection 504. For instance, the first projection 502 may be disposed on an inner surface of the door 310 (e.g., toward the volume 308) such that the first projection 502 extends from the door 310 toward the net 314. The second projection 504 may be disposed on an outer surface of the net 314 such that the second projection 504 extends from the net 314 toward the door 310. The first projection 502 is configured to engage with the second projection 504. For instance, the first projection 502 may include a first portion 506 and a second portion 508 extending perpendicularly from the first portion 506 such that the first projection 502 forms substantially an "L" shape. Further, the second projection 504 may include a first portion 510 and a second portion 512 extending perpendicularly from the first portion 510 such that the second projection 504 forms substantially an "L" shape. The first projection 502 and the second projection 504 may be positioned in opposite directions such that the second projection 504 of the first projection 502 is in confronting relation with the second portion 512 of the second projection 504.

The first locking mechanism 500 maintains the tension of the net 314. For instance, the net 314 may be compelled to retract due to the spring mechanism 316. However, that movement will be prevented by the first and second projections 502, 504, so that the net 314 will be in a tension state such that enough tension stiffness is created to hold the luggage 309 within the volume 308.

The first locking mechanism 500 includes a biasing member 514 (e.g., a spring). The biasing member 514 may be disposed along the door 310 and operably coupled to the first projection 504. The biasing member 514 is configured to bias the first projection 502 toward the second projection 504. Accordingly, the second projection 504 prevents the door 310 from separating from the net 314 in an engaged position (e.g., FIG. 5A).

Figure 5A:
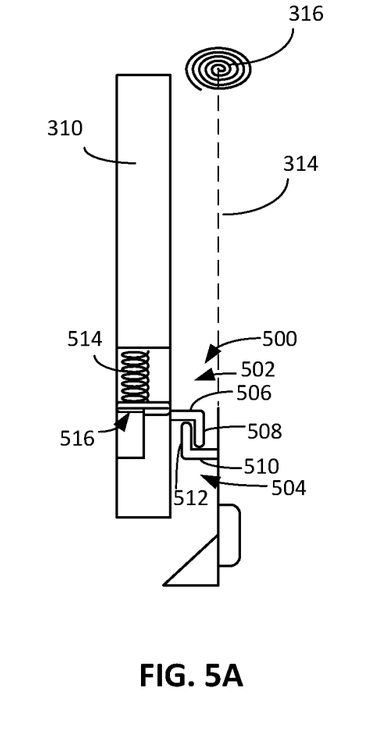
FIGS. 5A, 5B, 5C, 5D, 5E, and 5F illustrate a first locking mechanism of the overhead stowage bin of FIG. 4, according to various embodiments.
Figure 5B:
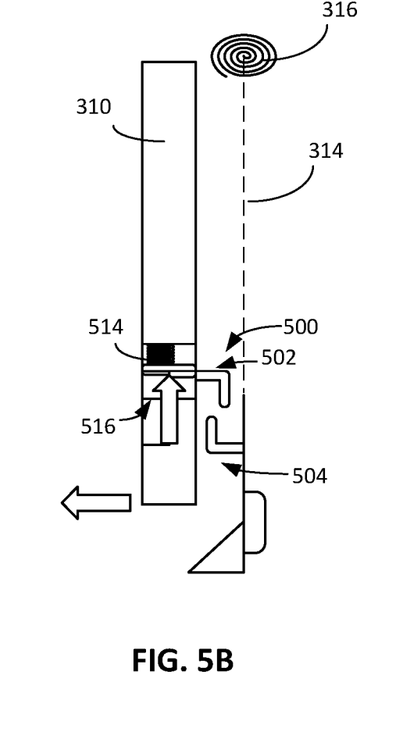
Figure 5C:
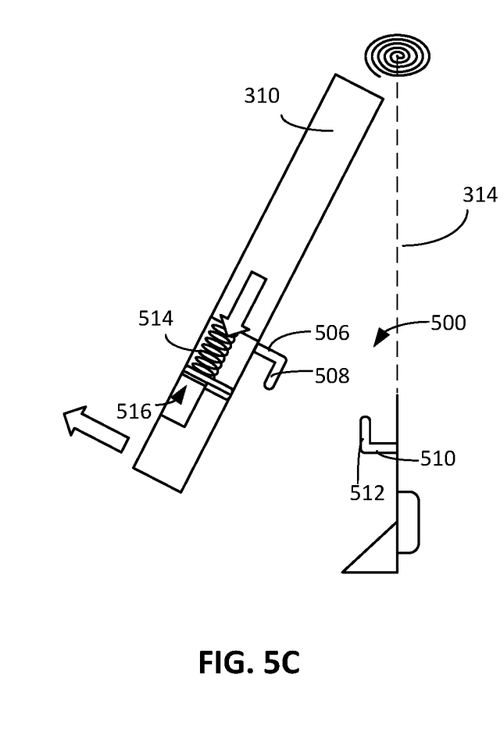
Figure 5D:
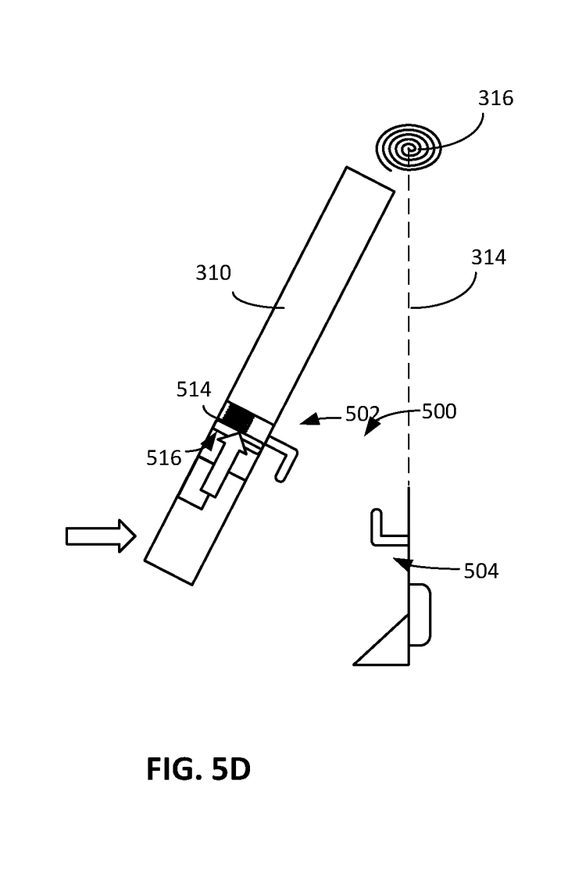
Figure 5E:
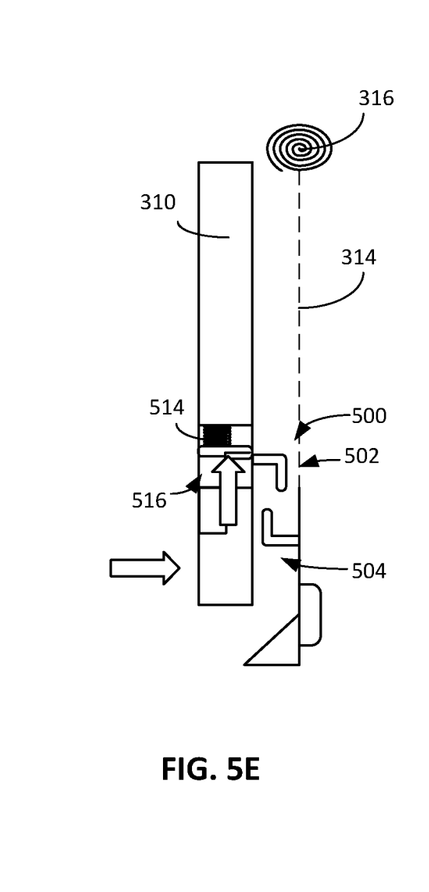
Figure 5F:
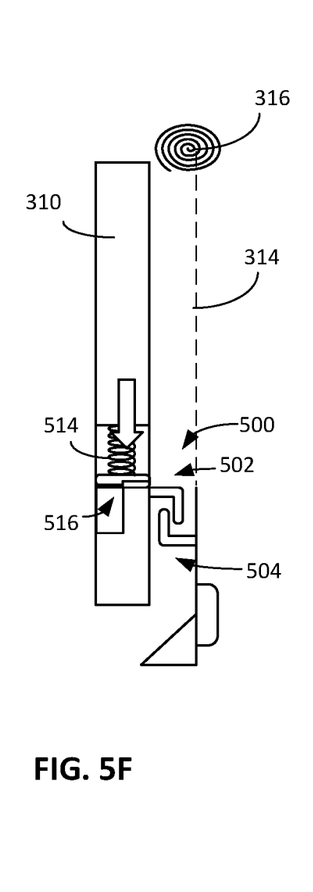

In order to disengage the door 310 from the net 314, a force may be applied to the biasing member 514 to move the biasing member 514, and in turn, move the first projection 502 away from the second projection 504 (e.g., FIG. 5B). For instance, the biasing member 514 may be coupled to a lever 516 such that the biasing member receives the force via the lever 516 (e.g., a user such as a crew member presses the lever). The door 310 may be opened (e.g., FIG. 5C) and the lever 516 and the biasing member 514 may rebound back to the original position. To close the door and reengage the locking mechanism 500, a force may be reapplied to the biasing member 514, thus moving the first projection 502 and clearing any potential interference with the second projection 504 while the doors closes (e.g., FIGS. 5D-5E). Once in the closed position, the lever 516 may be released, reverting the biasing member 514 to its original position and reengaging the first projection 502 with the second projection 504.

Thus, due to the first locking mechanism 500, the flight crew has the option of opening the door 310 while retaining the net 314 in its extended position, and, optionally, bringing the net 314 with the door 310 or leaving it in its locked position.

Referring now to FIGS. 6A-6J, the second locking mechanism 600 is illustrated. The second locking mechanism 600 is disposed along the lower panel 306 and configured to lock the net 314 to the plurality of side panels 305 so that the door 310 may move independently from the net 314. The second locking mechanism 600 includes a base 604 having a first end 612 and a second end 614 opposite the first end 612. The base 604 may be coupled to the lower panel 306 of the bin 300. The base 604 may extend parallel to the lower panel 306. The base 604 may be coupled to a biasing assembly 606. The biasing assembly 606 may include a biasing member 608 (e.g., a spring) and a surface 610. The biasing member 608 may be fixed to the base 604 at the first end 612 and the surface 610 may be coupled to the biasing member 608 at the opposite end of the biasing member 608. The biasing member 608 and the surface 610 are configured to operate in conjunction such that when a force is applied to the surface 610, the biasing member 608 is compressed.

The second locking mechanism 600 further includes a lock pin assembly 616. The lock pin assembly 616 may be a flexible structure configured to rotate about a fixed point at the first end 612 of the base 604. For instance, the lock pin assembly 616 includes a first portion 618 extending parallel to the base 604 and coupled to the base 604 at the first end 612. The lock pin assembly 616 further includes a second portion 620. The second portion 620 may be a tab, a flange, or other structure configured to extend from the first portion 618. For instance, the second portion 620 is configured to extend perpendicularly from the first portion 618, such that the second portion 620 is configured to be in confronting relation with the surface 610.

The second locking mechanism 600 further includes a push button 622. The push button 622 may be disposed along the door 310 (e.g., see FIG. 4). The push button may be configured to trigger the lock pin assembly 616 and the biasing assembly 606. For instance, when the door 310 is closing, the push button 622 may align with and push the clip 322. As a result, the clip 322 may interface with the second portion 620 of the lock pin assembly 616, causing rotation of the first portion 618, and allowing the clip 322 to continue moving toward the first end 612 of the base 604 (e.g., FIGS. 6B-6D, respectively). Once the clip 322 has traveled toward the first end 612 enough that it has cleared the second portion 620, the second portion 620 will return (e.g., rebound) to its original position and capture the clip 322 against the surface 610 (e.g., FIG. 6E). The biasing member 608 applies a force back against the clip 322 to secure it in place.

Figure 6A:
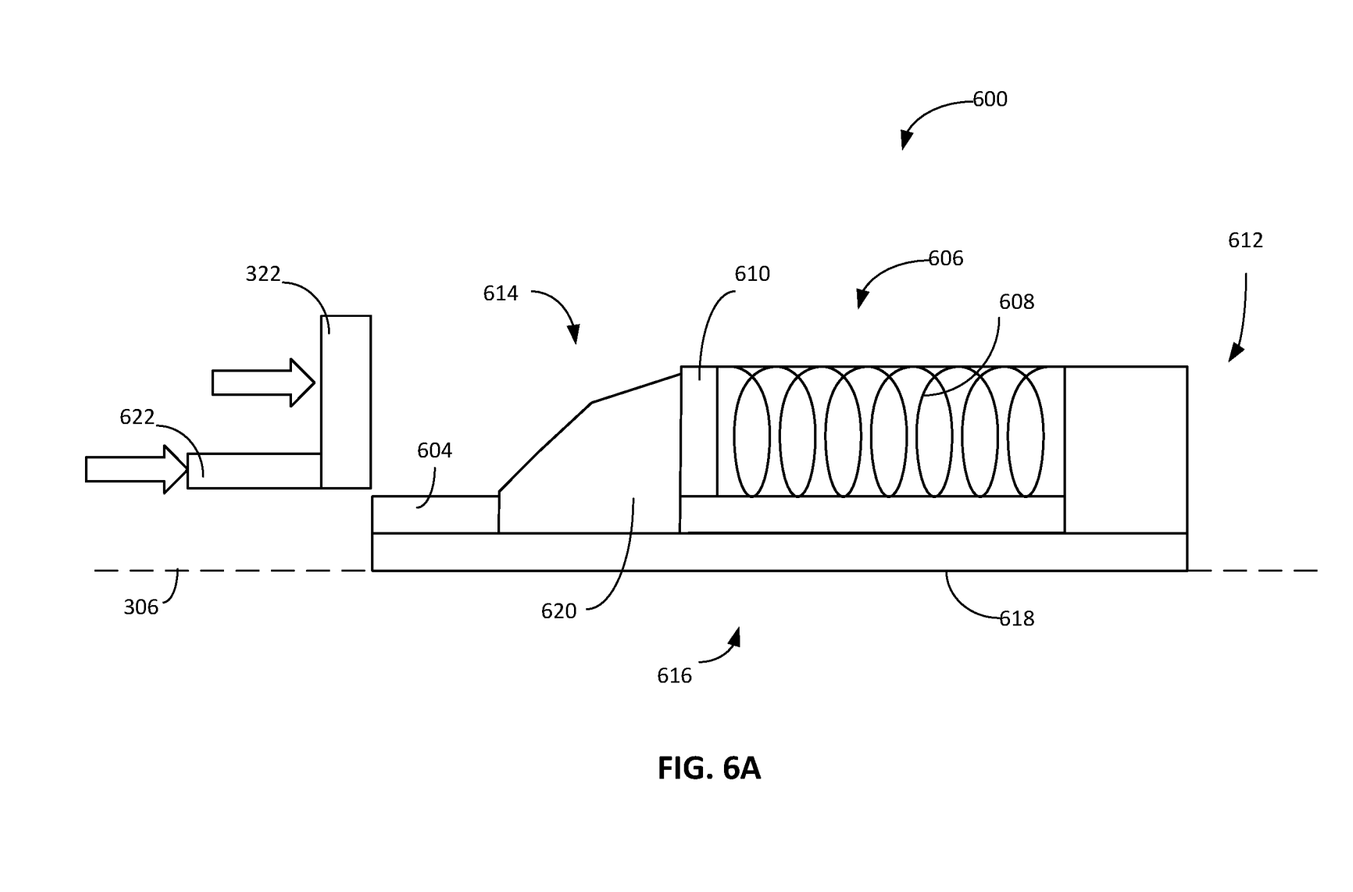
FIGS. 6A, 6B, 6C, 6D, 6E, 6F, 6G, 6H, 6I, and 6J illustrate a second locking mechanism of the overhead stowage bin of FIG. 4, according to various embodiments.
Figure 6B:
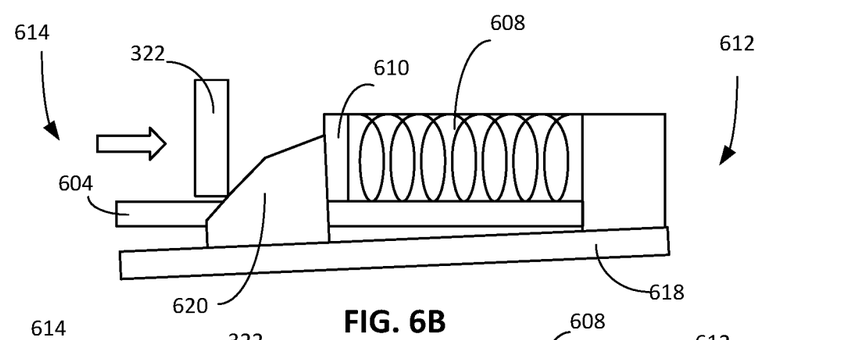
Figure 6C:
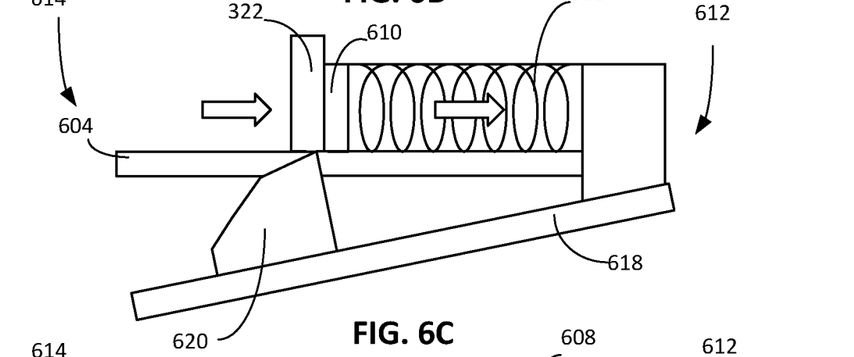
Figure 6D:
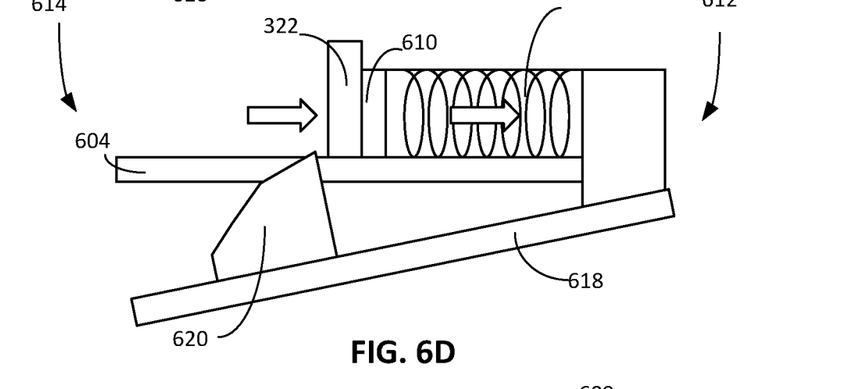
Figure 6E:
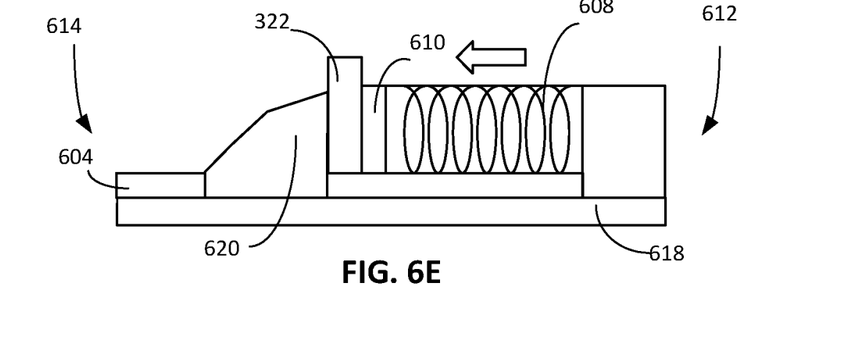
Figure 6F:
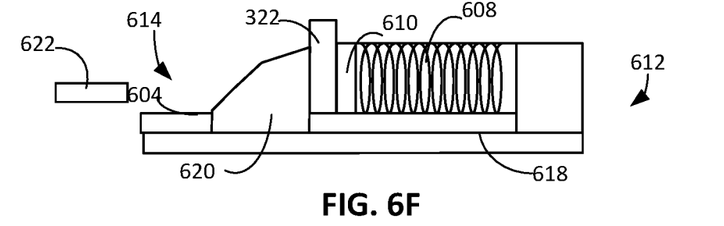
Figure 6G:
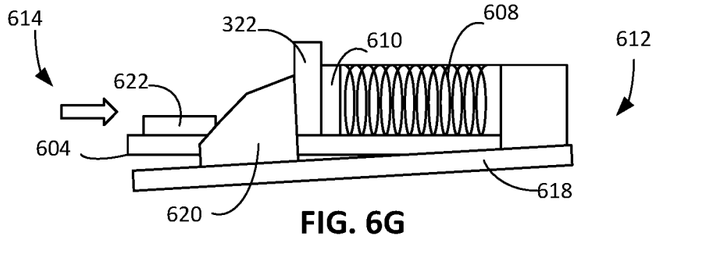
Figure 6H:
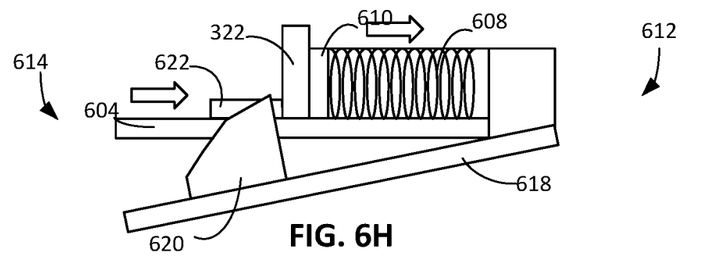
Figure 6I:
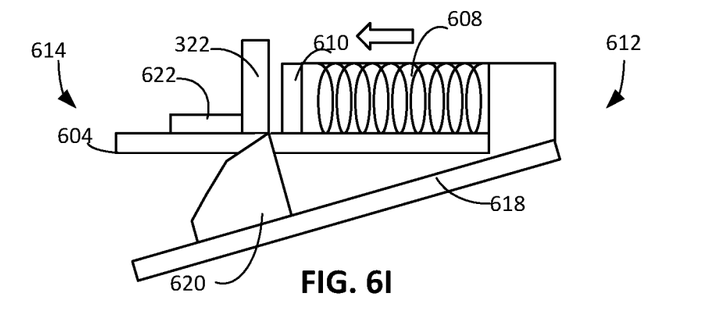
Figure 6J:
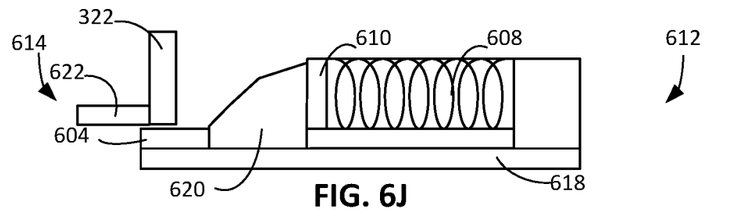
Figure 7A:
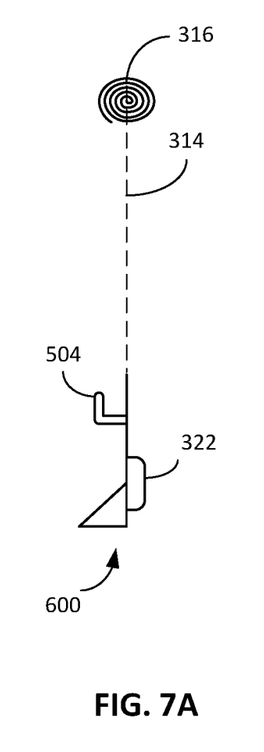
FIGS. 7A, 7B, 7C, and 7D illustrate a spring mechanism of the overhead stowage bin of FIG. 4, according to various embodiments.
Figure 7B:
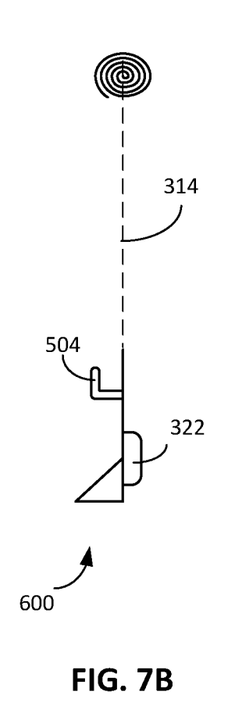
Figure 7C:
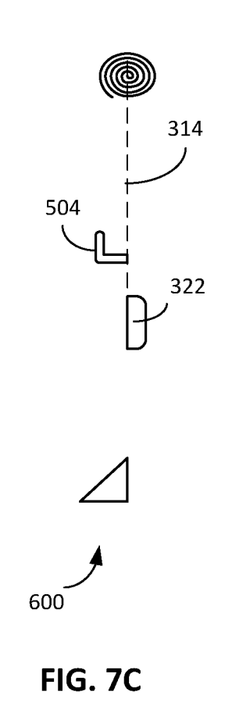
Figure 7D:
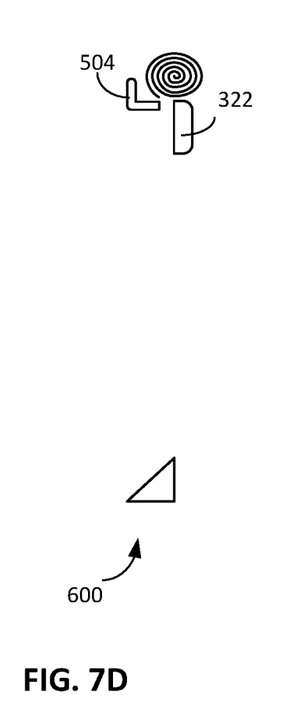

In order to disengage the net 314 from the second locking mechanism 600, the push button 622 may be pressed, such that the push button 622 may interface with the second portion 620 of the lock pin assembly 616, causing rotation of the first portion 618 (e.g., FIGS. 6F-6H). Accordingly, with the force from the biasing member 608 still applied against the clip 322, when the second portion 620 has rotated along with the first portion 618, the net 314 may be released from in between the second portion 620 and the surface 610.

Thus, due to the second locking mechanism 600, the flight crew has the option of opening the door 310 without triggering the push button 622 and retaining the net 314 in its extended and locked position, or opening the door 310 and releasing the net 314 to is retracted position. For instance, when the flight crew chooses to open the door 310 and release the net 314 via the second locking mechanism 600, the net 314 automatically retracts.

Referring now to FIGS. 7A-7D, the spring mechanism 316 is illustrated. As the spring mechanism 316 is already loaded, when the tension is released from the clip 322, the spring mechanism 316 will automatically wind and the net 314 will retract (e.g., wind up).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment: for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An overhead stowage bin, comprising:
a ceiling panel, a back panel, a lower panel, and a plurality of side panels, wherein the ceiling panel, the back panel, the lower panel, and the plurality of side panels define a volume configured to stow luggage;
a cabin door configured to enclose the volume and configured to rotate about a hinge disposed on the ceiling panel;
a net configured to extend along the cabin door in an extended position; and
a locking mechanism configured to lock the net to the cabin door and comprising a first projection disposed on the cabin door such that the first projection extends from the cabin door toward the net, wherein the first projection comprises a first portion and a second portion extending perpendicularly from the first portion.

2. The overhead stowage bin of claim 1, wherein the locking mechanism comprises a second projection disposed on the net such that the second projection extends from the net toward the cabin door.

3. The overhead stowage bin of claim 2, wherein the second projection comprises a first portion and a second portion extending perpendicularly from the first portion.

4. The overhead stowage bin of claim 3, wherein the first projection is configured to engage with the second projection such that the second portion of the first projection is in confronting relation with the second portion of the second projection.

5. The overhead stowage bin of claim 4, further comprising a rotating rod configured to couple to the net and configured to couple to the plurality of side panels such that the net extends along the rotating rod between the plurality of side panels.

6. The overhead stowage bin of claim 5, further comprising a spring mechanism coupled to the rotating rod.

7. The overhead stowage bin of claim 6, wherein the locking mechanism maintains a tension of the net such that the net compelled to retract via the spring mechanism prevented by the engagement between the first projection and the second projection.

8. The overhead stowage bin of claim 7, further comprising a biasing member disposed along the cabin door and operably coupled to the first projection such that the biasing member is configured to bias the first projection toward the second projection.

9. An overhead stowage bin, comprising:
a ceiling panel, a back panel, a lower panel, and a plurality of side panels, wherein the ceiling panel, the back panel, the lower panel, and the plurality of side panels define a volume configured to stow luggage;
a cabin door configured to enclose the volume and configured to rotate about a hinge disposed on the ceiling panel;
a net configured to extend along the cabin door in an extended position;
a locking mechanism configured to lock the net in the extended position; and
a rotating rod configured to couple to the net and configured to couple to the plurality of side panels such that the net extends along the rotating rod between the plurality of side panels.

10. The overhead stowage bin of claim 9, further comprising a spring mechanism coupled to the rotating rod.

11. The overhead stowage bin of claim 10, further comprising a clip disposed along an edge of the net.

12. The overhead stowage bin of claim 11, wherein the locking mechanism comprises a base having a first end and a second end opposite the first end, the base coupled to the lower panel.

13. The overhead stowage bin of claim 12, further comprising a biasing assembly coupled to the base, the biasing assembly comprising a biasing member fixed to the base at the first end and a surface.

14. The overhead stowage bin of claim 13, wherein the biasing member and the surface are configured to operate in conjunction such that when a force is applied to the surface, the biasing member is compressed.

15. The overhead stowage bin of claim 14, further comprising a lock pin assembly configured to rotate about a fixed point at the first end of the base, the lock pin assembly comprising:
a first portion extending parallel to the base and coupled to the base at the first end; and
a second portion configured to extend perpendicularly from the first portion, such that the second portion is configured to be in confronting relation with the surface.

16. The overhead stowage bin of claim 15, further comprising a push button disposed along the cabin door and configured to trigger the lock pin assembly and the biasing assembly, such that in response to the cabin door closing, the push button causes the clip to interface with the second portion of the lock pin assembly, causing rotation of the first portion, and allowing the clip to continue moving toward the first end of the base until the clip clears the second portion and the second portion rebounds to its original position, capturing the clip against the surface with the biasing member applying a force against the clip to secure it in place.

17. The overhead stowage bin of claim 16, wherein the locking mechanism maintains a tension of the net such that the net compelled to retract via the spring mechanism is prevented by the engagement of the clip between the surface and the second portion.

* * * * *